United States Patent
Sugiyama et al.

(10) Patent No.: US 11,524,681 B2
(45) Date of Patent: Dec. 13, 2022

(54) CONTROL APPARATUS FOR VEHICLE, CONTROL METHOD FOR VEHICLE, AND COMPUTER-READ ABLE RECORDING MEDIUM

(71) Applicant: SUBARU CORPORATION, Tokyo (JP)

(72) Inventors: Akiko Sugiyama, Tokyo (JP); Takeshi Torii, Tokyo (JP); Ryuichi Sumikawa, Tokyo (JP); Noeru Sato, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 205 days.

(21) Appl. No.: 16/735,850

(22) Filed: Jan. 7, 2020

(65) Prior Publication Data
US 2020/0282989 A1    Sep. 10, 2020

(30) Foreign Application Priority Data
Mar. 8, 2019    (JP) .............................. JP2019-043122

(51) Int. Cl.
*B60W 40/09*    (2012.01)
*B60W 30/18*    (2012.01)
*B60W 30/165*    (2020.01)

(52) U.S. Cl.
CPC .... *B60W 30/165* (2013.01); *B60W 30/18163* (2013.01); *B60W 40/09* (2013.01)

(58) Field of Classification Search
CPC .... B60W 30/16; B60W 30/14; B60W 30/146; B60W 30/165; B60W 30/18163; B60W 40/09; B60W 40/08
See application file for complete search history.

(56) References Cited

U.S. PATENT DOCUMENTS

| | | | | |
|---|---|---|---|---|
| 9,475,491 | B1* | 10/2016 | Nagasaka | B60W 30/18163 |
| 9,623,876 | B1* | 4/2017 | Slusar | G09B 19/167 |
| 9,718,473 | B2* | 8/2017 | Suzuki | B60W 30/18163 |
| 10,173,667 | B2* | 1/2019 | Chan | A61B 5/4875 |
| 10,795,375 | B2* | 10/2020 | Shalev-Shwartz | G06N 5/046 |
| 10,977,944 | B2* | 4/2021 | Baba | G08G 1/166 |

(Continued)

FOREIGN PATENT DOCUMENTS

JP    2003-99897 A    4/2003

OTHER PUBLICATIONS

Kelsey R. Thompson, Amy M. Johnson, Jamie L. Emerson, Jeffrey D. Dawson, Erwin R. Boer, Matthew Rizzo, Distracted driving in elderly and middle-aged drivers, Accident Analysis & Prevention, vol. 45, 2012, pp. 711-717, ISSN 0001-4575, https://doi.org/10.1016/j.aap.2011.09.040. (Year: 2012).*

*Primary Examiner* — Jaime Figueroa
*Assistant Examiner* — Joshua Alexander Garza
(74) *Attorney, Agent, or Firm* — Troutman Pepper Hamilton Sanders LLP (57) ABSTRACT

A control apparatus for a vehicle includes a skill level acquiring unit and an inter-vehicle distance controller. The skill level acquiring unit is configured to acquire a driving skill level of a driver of a first vehicle other than a second vehicle. The second vehicle is an own vehicle. The inter-vehicle distance controller is configured to control an inter-vehicle distance from the first vehicle to the second vehicle on the basis of the driving skill level acquired by the skill level acquiring unit.

12 Claims, 6 Drawing Sheets

(56) References Cited

U.S. PATENT DOCUMENTS

| | | | | |
|---|---|---|---|---|
| 2004/0105053 A1* | 6/2004 | Ozeki | ............... | B60K 37/00 |
| | | | | 349/112 |
| 2010/0209881 A1* | 8/2010 | Lin | ............... | G09B 19/167 |
| | | | | 434/66 |
| 2015/0057914 A1* | 2/2015 | Hiramatsu | ............ | G08G 1/164 |
| | | | | 701/117 |
| 2016/0185388 A1* | 6/2016 | Sim | ............. | B60W 10/20 |
| | | | | 701/41 |
| 2017/0032402 A1* | 2/2017 | Patsiokas | .......... | G06Q 30/0261 |
| 2017/0305332 A1* | 10/2017 | Albou | ............... | B60Q 1/525 |
| 2017/0365165 A1* | 12/2017 | Landfors | ............. | G08G 1/0141 |
| 2018/0158338 A1* | 6/2018 | Kawaguchi | .......... | B60W 50/14 |
| 2019/0221053 A1* | 7/2019 | Sato | ............... | G06Q 50/30 |
| 2020/0023839 A1* | 1/2020 | Yan | ............... | B60W 40/09 |
| 2020/0122741 A1* | 4/2020 | Kuehnle | ............ | B60W 50/085 |
| 2021/0269055 A1* | 9/2021 | Kokido | ............... | B60W 40/08 |

* cited by examiner

CONTROL APPARATUS FOR VEHICLE, CONTROL METHOD FOR VEHICLE, AND COMPUTER-READ ABLE RECORDING MEDIUM

CROSS-REFERENCE TO RELATED APPLICATIONS

The present application claims priority from Japanese Patent Application No. 2019-043122 filed on Mar. 8, 2019, the entire contents of which are hereby incorporated by reference.

BACKGROUND

The technology relates to a control apparatus for a vehicle, a control method for a vehicle, and a computer-readable recording medium that each cause control of a vehicle to be performed on the basis of a driving skill level of a driver.

Japanese Unexamined Patent Application Publication No. 2003-099897 discloses a technique that determines a skill level of a driver on the basis of a driving state of a vehicle, more specifically, on the basis of a driving state at a time when the vehicle is traveling on a curved road.

SUMMARY

An aspect of the technology provides a control apparatus, for a vehicle. The control apparatus includes a skill level acquiring unit and an inter-vehicle distance controller. The skill level acquiring unit is configured to acquire a driving skill level of a driver of a first vehicle other than a second vehicle. The second vehicle is an own vehicle. The inter-vehicle distance controller is configured to control an inter-vehicle distance from the first vehicle to the second vehicle on the basis of the driving skill level acquired by the skill level acquiring unit.

An aspect of the technology provides a control apparatus, for a vehicle. The control apparatus includes a skill level acquiring unit and a lane change unit. The skill level acquiring unit is configured to acquire a driving skill level of a driver of a first vehicle other than a second vehicle. The second vehicle is an own vehicle. The lane change unit is configured to perform lane change of the second vehicle when a predetermined condition based on the driving skill level acquired by the skill level acquiring unit is satisfied.

An aspect of the technology provides a control method for a vehicle. The method includes: acquiring a driving skill level of a driver of a first vehicle other than a second vehicle that is being an own vehicle, and controlling an inter-vehicle distance from the first vehicle to the second vehicle on the basis of the acquired driving skill level.

An aspect of the technology provides a non-transitory computer-readable recording medium containing a program. The program causes, when executed by a computer, the computer to implement a method. The method includes acquiring a driving skill level of a driver of a first vehicle other than a second vehicle that is an own vehicle, and controlling an inter-vehicle distance from the first vehicle to the second vehicle on the basis of the acquired driving skill level.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

In the following, some example embodiments of the technology are described with reference to the accompanying drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, the shape of each of the elements, a size of each of the elements, a ratio between the elements, and relative positional relationship between the elements are illustrative only and not to be construed as limiting to the technology. Further, elements in the following example embodiments which are not recited in a most-generic independent claim of the disclosure are optional and may be provided on an as-needed basis. Throughout the present specification and the drawings, elements having substantially the same operation and configuration are denoted with the same numerals to avoid any redundant description.

Figure 1:
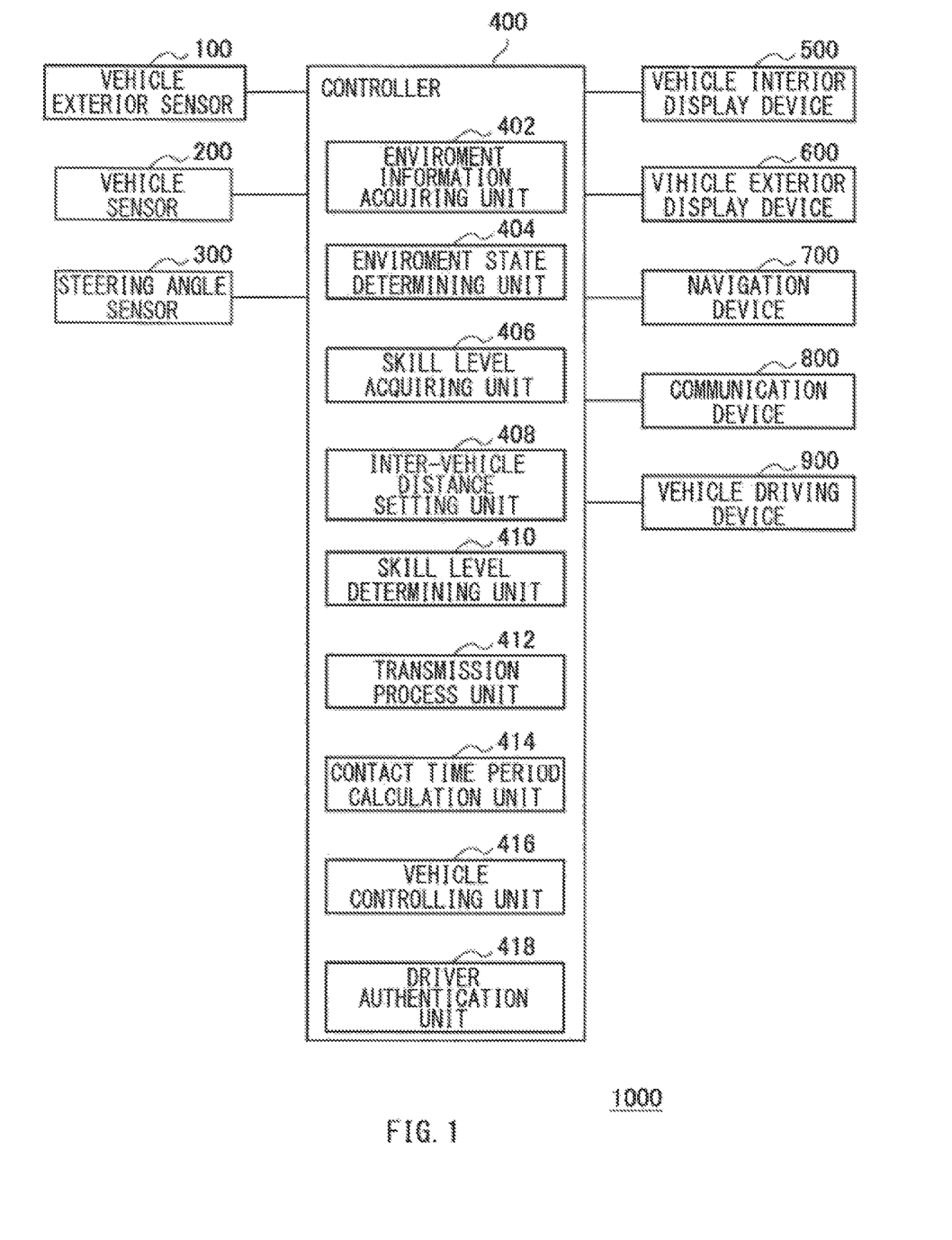
FIG. 1 is a schematic diagram illustrating an example of a configuration of a vehicle system according to one example embodiment of the technology.

FIG. 1 is a schematic diagram illustrating a configuration of a vehicle system 1000 according to an example embodiment of the technology. The vehicle system 1000 may be basically mounted on a vehicle such as an automobile. The vehicle system 1000 may include a vehicle exterior sensor 100, a vehicle sensor 200, a steering angle sensor 300, a controller 400, a vehicle interior display device 500, a vehicle exterior display device 600, a navigation device 700, a communication device 800, and a vehicle driving device 900, as illustrated in FIG. 1.

The vehicle exterior sensor 100 may include a device such as a stereo camera, a monocular camera, a millimeter-wave radar device, or an infrared sensor. The vehicle exterior sensor 100 may measure a position and a speed of an object around the own vehicle such as a person, another vehicle, or an on-road object that is installed on a road. In a case where the vehicle exterior sensor 100 includes the stereo camera, the stereo camera may include a pair of a right camera and a left camera. The right camera and the left camera may each include an imaging device such as a charge-coupled device (CCD) sensor or a complementary metal oxide semiconductor (CMOS) sensor. The stereo camera may pick up an image of an external environment outside the vehicle and supply information of the picked-up image to the controller 400. In one non-limiting example, the stereo camera may include color cameras that are able to acquire color information, and may be disposed at an upper portion of a windshield of the vehicle.

The vehicle sensor 200 may acquire information communicated by means of an in-vehicle controller area network (CAN) such as information regarding a speed, an acceleration, an angular velocity, or a yaw rate of the vehicle. The above-described information may be acquired from various sensors. The steering angle sensor 300 may be attached to a steering wheel and detect a rotation angle of the steering wheel.

The controller 400 may change a setting of an inter-vehicle distance from the own vehicle to the other vehicle on the basis of a driving skill level of a driver of the other vehicle. Further, the controller 400 may determine a driving skill level of a driver of the own vehicle and supply information regarding the determined driving skill level to the other vehicle in order to prompt the other vehicle to change a setting of the inter-vehicle distance. Further, the controller 400 may control lane change of the own vehicle on the basis of a driving skill level of a driver of another vehicle that travels side by side with the own vehicle. The other vehicle that travels side by side with the own vehicle may be hereinafter referred to as a "side-by-side vehicle." A typical but non-limiting example of the side-by-side vehicle may include the other vehicle that travels on a lane adjacent to a lane on which the own vehicle travels. The controller 400 may acquire, from the other vehicle, the driving skill level of the driver of the other vehicle. The controller 400 may therefore include an environment information acquiring unit 402, an environment state determining unit 404, a skill level acquiring unit 406, an inter-vehicle distance setting unit 408, a skill level determining unit 410, a transmission process unit 412, a contact time period calculating unit 414, a vehicle controlling unit 416, and a driver authentication unit 418. In one embodiment, the vehicle controlling unit 416 may serve as a "lane change unit." It is to be noted that the controller 400 may include a microcomputer provided with devices such as a central processing unit (CPU), various storage devices, or an input-output interface. Non-limiting examples of the storage devices may include a read-only memory (ROM) and a random-access memory (RAM). Each component illustrated in FIG. 1 may be implemented by means of software as a functional module.

The environment information acquiring unit 402 may be able to generate distance information, i.e., information regarding a distance to an object, and acquire the distance information. The environment information acquiring unit 402 may generate the distance information on the basis of principle of triangulation from a shift amount between corresponding positions of a pair of right and left stereo images. The pair of right and left stereo images may be taken by a pair of right and left cameras of a stereo camera included in the vehicle exterior sensor 100. The environment information acquiring unit 402 may also be able to acquire subject position information, i.e., information regarding a position of a subject of an image, from image information. Further, the environment information acquiring unit 402 may perform a known grouping process on pieces of distance information generated on the basis of the principle of triangulation, and compare the pieces of distance information subjected to the grouping process with information such as preset three-dimensional object data to detect data such as three-dimensional object data or lane line data. The controller 400 may be thereby able to recognize an object such as a human, the other vehicle, or the on-road object. Non-limiting examples of the on-road object may include a temporary stop sign, a stop line, and an electronic toll collection (ETC) gate.

The environment information acquiring unit 402 may be able to calculate a variation amount of a distance from the own vehicle to an object such as a person or the other vehicle and a relative speed of the own vehicle to the object such as the person or the other vehicle, with use of the distance information regarding the object such as the person or the other vehicle generated on the basis of the principle of triangulation. The variation amount of the distance may be calculated by integrating distances between frame images detected every unit time period. The relative speed may be calculated by dividing the distance detected every unit time period by the unit time period.

The environment information acquiring unit 402 may thus acquire image information outside the own vehicle from the vehicle exterior sensor 100 to perform an image analysis process, thereby analyzing the image information to acquire environment information outside the vehicle.

The environment state determining unit 404 may determine an environment state outside the vehicle on the basis of the environment information acquired by the environment information acquiring unit 402. In one example, the environment state determining unit 404 may be able to determine a state of a person or the other vehicle as an object outside the vehicle.

The skill level acquiring unit 406 may acquire, via the communication device 800, a driving skill level of the driver of the other vehicle transmitted from the other vehicle.

The inter-vehicle distance setting unit 408 may set the inter-vehicle distance from the own vehicle to the other vehicle on the basis of the driving skill level acquired by the skill level acquiring unit 406.

The skill level determining unit 410 may determine the driving skill level of the driver of the own vehicle.

The transmission process unit 412 may perform a process of transmitting a result of the determination performed by the skill level determining unit 410 to the other vehicle via the communication device 800. The transmission process unit 412 may also perform a process of transmitting information regarding a position of the own vehicle to the other vehicle via the communication device 800.

The contact time period calculating unit 414 may calculate a contact time period TTC. The contact time period TTC may be a time period to a time at which the own vehicle comes into contact with the side-by-side vehicle in a case where the lane change is performed under presence of the side-by-side vehicle. In one example embodiment, the contact time period TTC may be a time period from a current time to the time at which the own vehicle comes into contact with the side-by-side vehicle. In another example embodiment, the contact time period TTC may be a time period from a time at which the lane change is started to the time at which the own vehicle comes into contact with the side-by-side vehicle.

The vehicle controlling unit 416 may so control the vehicle driving device 900 that an inter-vehicle distance from the own vehicle to the other vehicle traveling in front of the own vehicle becomes a value set by the inter-vehicle distance setting unit 408. The other vehicle traveling in front of the own vehicle may be hereinafter referred to as a "preceding vehicle." Further, the vehicle controlling unit 416 may so control the vehicle driving device 900 that the lane change is performed in a case where the contact time period TTC is equal to or greater than a predetermined time period. In one example embodiment, the vehicle controlling unit 416 may so control the vehicle driving device 900 that the lane change is performed in a case where the other vehicle is absent within a predetermined range, on the basis of information acquired from the vehicle exterior sensor 100. In one example embodiment, the vehicle controlling unit 416 may so control the vehicle driving device 900 that the lane change is performed in cooperation with the other vehicle, on the basis of a result of communication with the other vehicle.

The vehicle interior display device 500 may perform display at a location such as an interior dash panel or a region around a meter.

The vehicle exterior display device 600 may perform display toward outside of the own vehicle. For example, the vehicle exterior display device 600 may perform display toward the other vehicle around the own vehicle. The vehicle exterior display device 600 may include a head-up display (HUD) device. The HUD device may cause information to be viewed in a field of view of a person. The HUD device may display a virtual image of information on glass such as a front windshield or a rear windshield of the vehicle.

The communication device 800 may communicate with outside of the own vehicle, and thereby receive various pieces of information such as road information or traffic information including traffic congestion information.

The navigation device 700 may hold map information. The navigation device 700 may search for a route from a current position to a destination on the basis of the map information. The navigation device 700 may be able to acquire the current position of the own vehicle by a method such as a global positioning system (GPS.) The navigation device 700 may hold information regarding a route to the current position that has been traveled by the own vehicle for a predetermined distance.

The vehicle driving device 900 may include a driving source such as an internal-combustion engine or an electric motor, and generate driving force that drives the own vehicle. The vehicle driving device 900 may also include an actuator such as an electric motor directed to steering. The vehicle driving device 900 may operate in accordance with a control command generated by the vehicle controlling unit 416.

Figure 2:
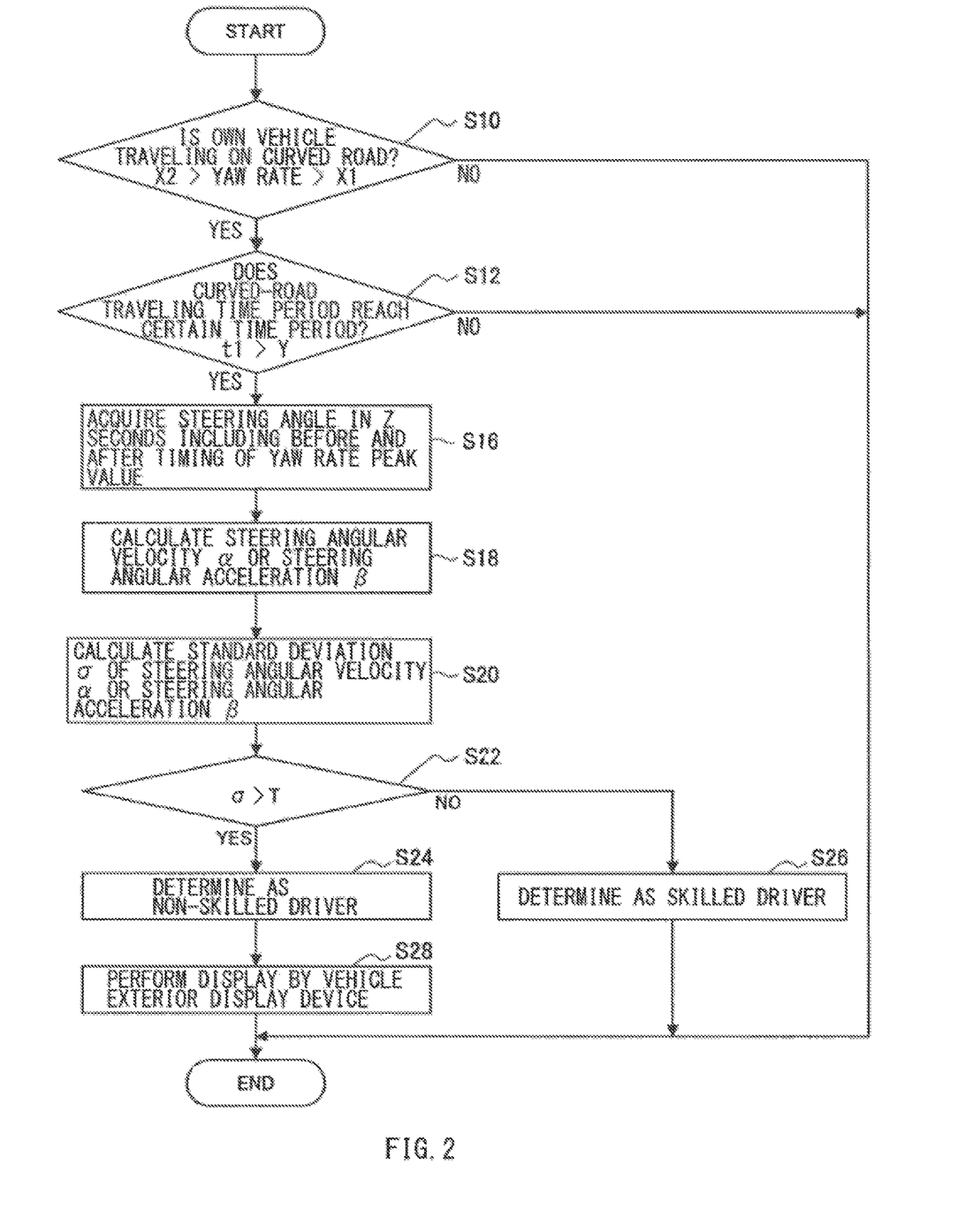
FIG. 2 is a flowchart illustrating an example of a process of determining whether a driver of a vehicle is a skilled driver, and when the driver is determined as being a non-skilled driver, displaying that the driver is the non-skilled driver toward outside of the vehicle.
Figure 3:
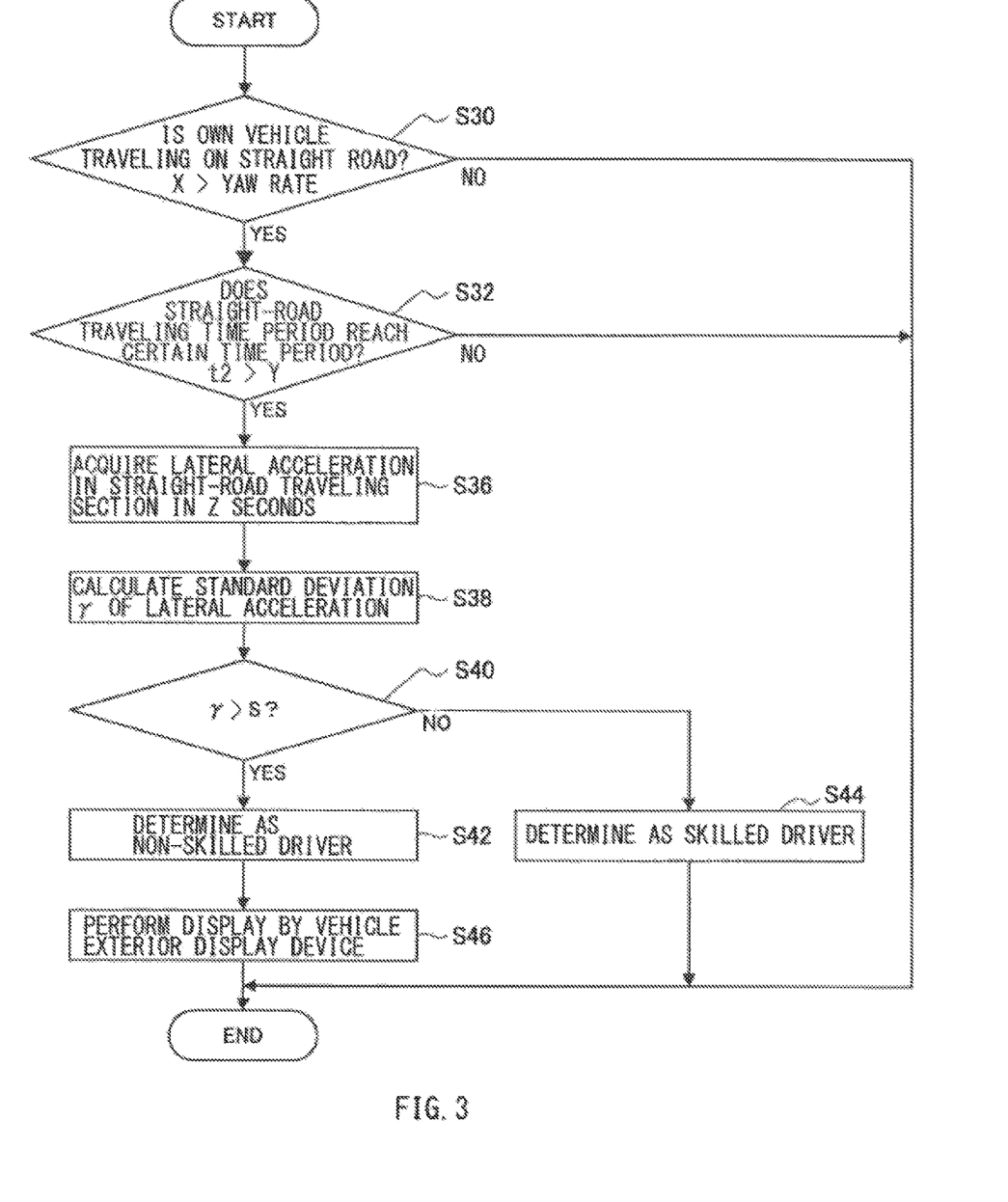
FIG. 3 is a flowchart illustrating another example of the process of determining whether the driver of the vehicle is the skilled driver, and when the driver is determined as being the non-skilled driver, displaying that the driver is the non-skilled driver toward the outside of the vehicle.

FIGS. 2 and 3 are each a flowchart illustrating an example of a process of determining whether the driver is a skilled driver, as a process of determining the driving skill level of the driver of the own vehicle, and causing, when the driver is not the skill driver, i.e., when the driver is the non-skilled driver, the vehicle exterior display device 600 to display that the driver is the non-skilled driver toward the outside of the own vehicle. The process illustrated in each of FIGS. 2 and 3 may be performed every predetermined cycle mainly by the skill level determining unit 410 of the controller 400.

FIG. 2 illustrates a process of determining the driving skill level of the driver on the basis of a driving state at a time when the vehicle is traveling on a curved road. The curved road may be a road with a single curved portion with no need to perform switching of steering or a road with a plurality of continuous curved portions. When the determination is made in the case where the own vehicle travels on the plurality of curved portions, detection values obtained for respective times steering switching is performed may be averaged, for example. The detection values may be values of the steering angle in the example embodiment.

First, in step S10, the controller 400 may determine whether the own vehicle is traveling on the curved road, on the basis of the yaw rate of the own vehicle detected by the vehicle sensor 200. In a specific but non-limiting example, the controller 400 may determine that the own vehicle is traveling on the curved road when the yaw rate is greater than a first threshold X1 and smaller than a second threshold X2 in step S10. The controller 400 may determine that the own vehicle is not traveling on the curved road in other cases. When the own vehicle is determined as being traveling on the curved road (YES in step S10), the process may proceed to step S12. When the own vehicle is determined as not being traveling on the curved road (NO in step S10), the controller 400 may bring a process of a present routine to an end.

In step S12, the controller 400 may determine whether a curved-road traveling time period t1, i.e., a time period during which the own vehicle is traveling on the curved road, reaches a certain time period. In a specific but non-limiting example, in step S12, the controller 400 may determine whether the curved-road traveling time period t1 is greater than a threshold Y. When the curved-road traveling time period t1 is greater than the threshold Y (YES in step S12), the controller 400 may determine that the curved-road traveling time period t1 reaches the certain time period, and the process may proceed to step S16. When the curved-road traveling time period t1 is equal to or smaller than the threshold Y (NO in step S12), the controller 400 may bring the process of the present routine to an end.

In step S16, the controller 400 may acquire a steering angle in a time period of Z seconds that includes time periods before and after timing at which the yaw rate of the own vehicle has a maximum value, i.e., a peak value, in the curved-road traveling time period t1 on the basis of the yaw rate of the own vehicle detected by the vehicle sensor 200. In step S18 thereafter, the controller 400 may calculate one of a steering angular velocity α and a steering angular acceleration β in the time period of Z seconds. In step S20 thereafter, the controller 400 may calculate a standard deviation σ of the one of the steering angular velocity α and the steering angular acceleration β calculated in step S16.

In step S22 thereafter, the controller 400 may determine whether a value of the standard deviation σ calculated in step S20 is greater than a predetermined threshold T. When the value of the standard deviation σ is determined as being greater than the predetermined threshold T (YES in step S22), the process may proceed to step S24. In a case where the process proceeds to step S24, it may be considered that steering is unstable since variation in the calculated one of the steering angular velocity α and the steering angular acceleration β is relatively great. Accordingly, the controller 400 may determine that the driver of the own vehicle is the non-skilled driver in step S24. The process may proceed to step S28 after step S24. In step S28, the controller 400 may generate a signal directed to causing the vehicle exterior display device 600 to display that the driver of the own vehicle is the non-skilled driver, and output the generated signal to the vehicle exterior display device 600. This may cause the vehicle exterior display device 600 to display that the driver of the own vehicle is the non-skilled driver toward the outside of the own vehicle, for example, toward the other vehicle around the own vehicle. The controller 400 may bring the process of the present routine to an end after performing the process in step S28.

In contrast, when the value of the standard deviation σ is determined as being equal to or smaller than the predetermined threshold T in step S22 (NO in step S22), the process may proceed to step S26. In a case where the process proceeds to step S26, it may be considered that the steering is stable since the variation in the calculated one of the steering angular velocity α and the steering angular acceleration β is relatively small. Accordingly, the controller 400 may determine that the driver of the own vehicle is the skilled driver in step S26. The controller 400 may not generate or output a signal for the vehicle exterior display device 600, and bring the process of the present routine to an end.

Figure 4A:
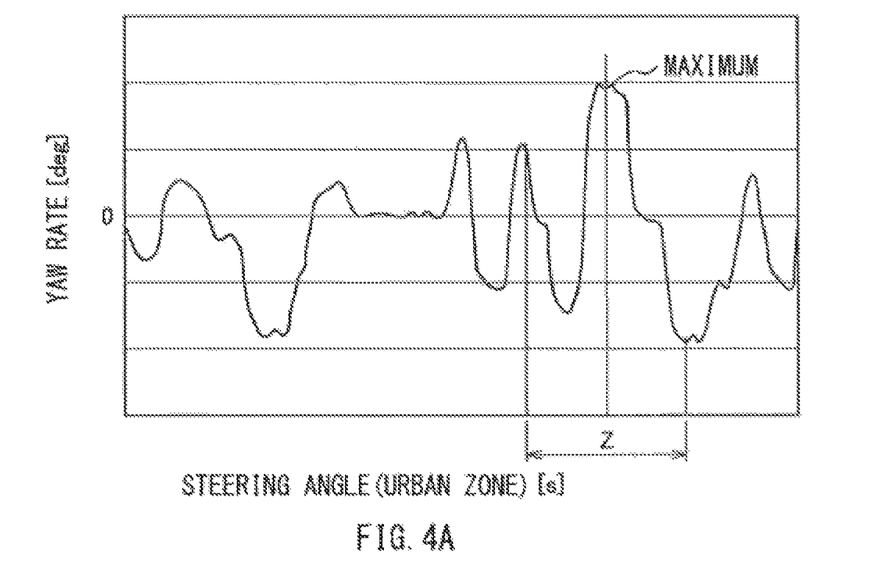
FIG. 4A is a characteristic diagram illustrating an example of a steering angle in a time period of Z seconds including time periods before and after timing at which a yaw rate has a maximum value, i.e., a peak value, in step S16 in FIG. 2.
Figure 4B:
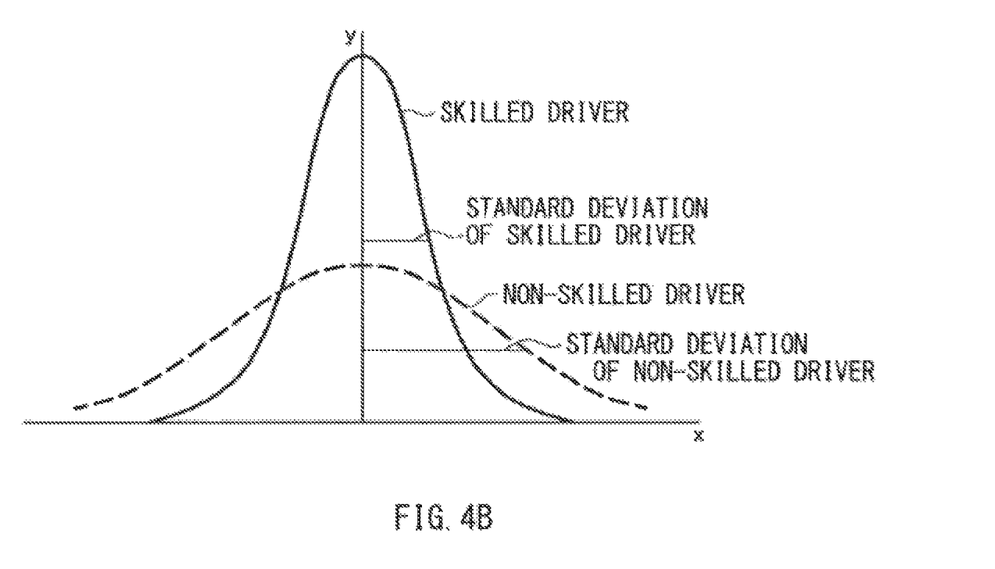
FIG. 4B is a characteristic diagram illustrating an example of standard deviations of the skilled driver and the non-skilled driver determined on the basis of a distribution of a steering angular velocity in the time period of Z seconds illustrated in FIG. 4A.

FIG. 4A is a characteristic diagram illustrating the steering angle in the time period of Z seconds including the time periods before and after the timing at which the yaw rate has the maximum value, i.e., the peak value, in step S16. FIG. 4B is a characteristic diagram illustrating standard deviations of the skilled driver and the non-skilled driver determined on the basis of a distribution of the steering angular velocity in the time period of Z seconds illustrated in FIG. 4A. As illustrated in FIG. 4B, the distribution of the steering angular velocity of the skilled driver may be narrower than that of the non-skilled driver, and a value of the standard deviation of the skilled driver may be therefore greater than that of the non-skilled driver. It is therefore possible to determine whether the driver is the skilled driver on the basis of the value of the standard deviation or a width of the distribution.

FIG. 3 illustrates a process of determining the driving skill level of the driver on the basis of a driving state at a time when the vehicle is traveling on a straight road. Wobbling of the own vehicle that is traveling on the straight road may be evaluated on the basis of a standard deviation of a lateral acceleration of the vehicle to thereby determine the driving skill level in this process.

First, in step S30, the controller 400 may determine whether the own vehicle is traveling on the straight road on the basis of the yaw rate of the own vehicle detected by the vehicle sensor 200. In a specific but non-limiting example, the controller 400 may determine that the own vehicle is traveling on the straight road in a case where the yaw rate is smaller than a predetermined threshold X in step S30. The controller 400 may determine that the own vehicle is not traveling on the straight road in a case where the yaw rate is equal to or greater than the predetermined threshold X in step S30. When the vehicle is determined as being traveling on the straight road (YES in step S30), the process may proceed to step S32. When the vehicle is determined as not being traveling on the straight road (NO in step S30), the controller 400 may bring a process of a present routine to an end.

In step S32, the controller 400 may determine whether a straight-road traveling time period t2, i.e., a time period during which the own vehicle is traveling on the straight road, reaches a certain time period. In a specific but non-limiting example, the controller 400 may determine whether the straight-road traveling time period t2 is greater than a predetermined threshold Y in step S32. When the straight-road traveling time period t2 is greater than the threshold Y (YES in step S32), the controller 400 may determine that the straight-road traveling time period t2 reaches the certain time, and the process may proceed to step S36. When the straight-road traveling time period t2 is equal to or smaller than the threshold Y (NO in step S32), the controller 400 may bring the process of the present routine to an end.

In step S36, the controller 400 may acquire a lateral acceleration in any or an appropriate straight-road traveling section in the straight-road traveling time period t2, on the basis of the lateral acceleration of the own vehicle acquired by the vehicle sensor 200. For example, the controller 400 may acquire the lateral acceleration in a time period of Z seconds in which the detected lateral acceleration is relatively small. In step S38 thereafter, the controller 400 may calculate a standard deviation γ of the lateral acceleration acquired in step S36.

In step S40 thereafter, the controller 400 may determine whether a value of the standard deviation γ calculated in step S38 is greater than a predetermined threshold S. When the value of the standard deviation γ is determined as being greater than the predetermined threshold S (YES in step S40), the process may proceed to step S42. In a case where the process proceeds to step S42, it may be considered that behavior of the vehicle is unstable since variation in the lateral acceleration is relatively great. Accordingly, the controller 400 may determine that the driver of the own vehicle is the non-skilled driver in step S42. The process may proceed to step S46 after step S42. In step S46, the controller 400 may generate a signal directed to causing the vehicle exterior display device 600 to display that the driver of the own vehicle is the non-skilled driver, and output the generated signal to the vehicle exterior display device 600. This may cause the vehicle exterior display device 600 to display that the driver of the own vehicle is the non-skilled driver toward the outside of the own vehicle, for example, toward the other vehicle around the own vehicle. The controller 400 may bring the process of the present routine to an end after performing the process in step S46.

In contrast, when the value of the standard deviation γ is determined as being equal to or smaller than the predetermined threshold S in step S40 (NO in step S40), the process may proceed to step S44. In a case where the process proceeds to step S44, it may be considered that the behavior of the vehicle is stable since the variation in the lateral acceleration is relatively small. Accordingly, the controller 400 may determine that the driver of the own vehicle is the skilled driver in step S44. In this case, the controller 400 may not generate or output a signal for the vehicle exterior display device 600, and bring the process of the present routine to an end.

In one example embodiment, the skill level determining unit 410 may not newly determine the driving skill level of a driver whose driving skill level has been already determined, and may determine the driving skill level of such a driver on the basis of a result of the authentication performed by the driver authentication unit 418. For example, in a case where a driver A that has been determined as the non-skilled driver by the skill level determining unit 410 in the past drives the own vehicle, the authentication of the driver A by the driver authentication unit 418 may allow for determination of the driver A as the non-skilled driver on the basis of the result of the authentication performed by the driver authentication unit 418 without performing the process illustrated in FIG. 2 or 3.

The determination of the driving skill level may be performed by a method other than the methods illustrated in FIGS. 2 and 3. In one example, the driving skill level may be determined by evaluating smoothness of the acceleration on the basis of a standard deviation of a variation rate of an accelerator pedal position. In another example, the driving skill level may be determined by evaluating the wobbling of the own vehicle traveling on the straight road on the basis of a traveling locus obtained by means of the GPS, lane line detection, or any other method. The evaluation of the wobbling of the own vehicle traveling on the straight road may be evaluated, for example but not limited to, on the basis of a result of analysis of a frequency of the steering angular velocity, a time at which an absolute value of the steering angular velocity exceeds a predetermined value, how many times the absolute value of the steering angular velocity exceeds the predetermined value, how often the absolute value of the steering angular velocity exceeds the predetermined value, a standard deviation of the yaw rate, or comparison of a factor such as the number of times the vehicle deviated from a lane with a threshold, other than the traveling locus. The driving skill level may be also evaluated by evaluating a way of keeping the inter-vehicle distance on the basis of a standard deviation of, for example, a time left before the own vehicle comes into contact with the other vehicle in front of the own vehicle.

As described above, in a case where the driving skill level of the driver of the own vehicle is low, in other words, in a case where the driver of the own vehicle is the non-skilled driver, the vehicle exterior display device 600 may display that the driver of the own vehicle is the non-skill driver toward the outside of the own vehicle. This allows the other vehicle or the driver of the other vehicle to recognize the display. This also allows a person outside the own vehicle such as a pedestrian to recognize the display. Accordingly, a person such as the driver of the other vehicle or the pedestrian may be able to recognize that the non-skilled driver is driving, and be thereby able to pay attention to the vehicle which the non-skilled driver is driving upon driving or walking. In a specific but non-limiting example, a driver of the other vehicle following the vehicle traveling in front of the other vehicle and driven by the non-skilled driver, i.e., the "own vehicle" controlled in the example embodiment, may be able to secure a relatively-long inter-vehicle distance.

Description is given next of a process, under assumption that an automatic driving vehicle is mixed in a series of vehicles including the own vehicle, of notifying the other vehicle around the own vehicle of the driving skill level of the driver of the own vehicle, and changing a setting of the inter-vehicle distance or prompting the other vehicle to change a setting of the inter-vehicle distance. Although the description is given below under assumption that the automatic driving of level 3 or higher is applied, an applicable automatic driving level is not limited thereto and may be level 1 or 2 which corresponds to so-called driving assistance.

Figure 5:
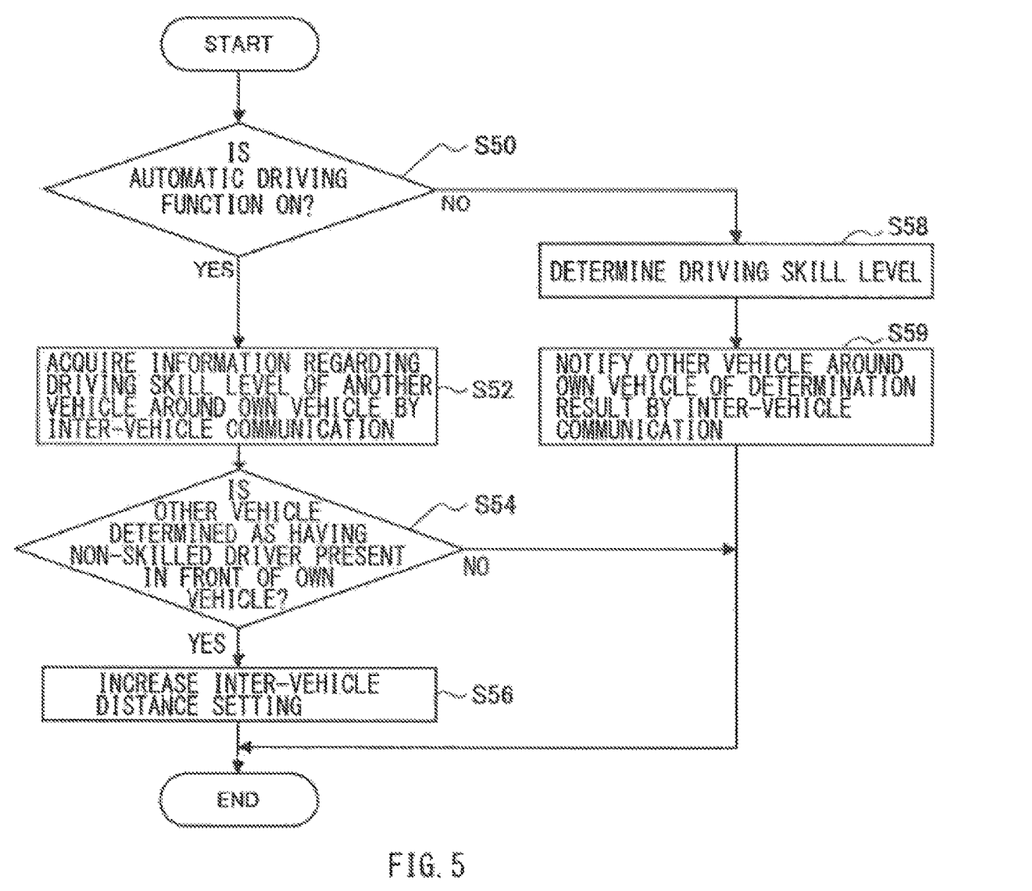
FIG. 5 is a flowchart illustrating an example of a process of controlling an inter-vehicle distance of an own vehicle or another vehicle in accordance with whether the own vehicle is performing automatic driving.

FIG. 5 is a flowchart illustrating an example of a process of causing the inter-vehicle distance to be controlled by the own vehicle or the other vehicle on the basis of the driving skill level in accordance with whether the own vehicle is performing automatic driving.

First, in step S50, the controller 400 may determine whether an automatic driving function of the own vehicle is ON. When the automatic driving function of the own vehicle is ON (YES in step S50), the process may proceed to step S52. When the automatic driving function of the own vehicle is OFF (NO in step S50), the process may proceed to step S58.

In a case where the process proceeds to step S52, the controller 400, in more detail, the skill level acquiring unit 406, may acquire information regarding the driving skill level of the driver of the other vehicle traveling around the own vehicle by performing inter-vehicle communication between the own vehicle and the other vehicle around the own vehicle via the communication device 800. The controller 400 or the skill level acquiring unit 406 may also acquire the position information of the other vehicle together with the driving skill level. The process may proceed to step S54 after step S52.

In step S54, the controller 400 may determine whether the other vehicle with the non-skilled driver is present in front of the own vehicle. Acquiring the position of the other vehicle together with the driving skill level in step S52 may allow for the determination as to whether the other vehicle determined as having the non-skilled driver is present in front of the own vehicle on the basis of comparison between the position of the own vehicle and the position of the other vehicle. When the other vehicle with the non-skilled driver is determined as being present in front of the own vehicle (YES in step S54), the process may proceed to step S56. In step S56, the controller 400, or in more detail, the inter-vehicle distance setting unit 408, may increase the inter-vehicle distance set with respect to the other vehicle in front of the own vehicle, i.e., the preceding vehicle.

The controller 400, or in more detail, the vehicle controlling unit 416 may generate a command signal related to control of the driving source on the basis of the inter-vehicle distance set in step S56, and output the generated command signal to the vehicle driving device 900. On this occasion, the inter-vehicle distance from the own vehicle to the preceding vehicle is acquired by the environment information acquiring unit 402. The vehicle controlling unit 416 may therefore so control the vehicle driving device 900 that the actual inter-vehicle distance from the own vehicle to the preceding vehicle becomes closer to the inter-vehicle distance set in step S56. This may maintain the inter-vehicle distance from the own vehicle to the preceding vehicle to be the set inter-vehicle distance or a distance close to the set inter-vehicle distance. The controller 400 may bring the process of the present routine to an end after step S56.

In a case where the process proceeds to step S58, the controller 400, or in more detail, the skill level determining unit 410 may determine the driving skill level of the driver of the own vehicle. This determination may be performed by a method described with reference to FIG. 2 or 3.

In step S59 thereafter, the controller 400 may cause the communication device 800 to perform inter-vehicle communication between the own vehicle and the other vehicle around the own vehicle to transmit a result of the determination in step S58 to the other vehicle. In a specific but non-limiting example, when the driver of the own vehicle is determined as being the non-skilled driver, the controller 400 may cause a signal indicating that the driver of the own vehicle is the non-skilled driver to be transmitted to the other vehicle. This causes the other vehicle having received the determination result to change the setting of the inter-vehicle distance and thereby increase the inter-vehicle distance with respect to a preceding vehicle when another vehicle determined as having the non-skilled driver is present ahead. The above-described change of the setting of the inter-vehicle distance by the other vehicle having received the determination result may be performed by processes similar to those described in step S52, S54, and S56. Alternatively, the driver of the own vehicle may be notified of that the driver of the preceding vehicle is the non-skilled driver and may be prompted to increase the inter-vehicle distance.

As described above, in a case where the other preceding vehicle determined as having the non-skilled driver is present in front of the own vehicle, the inter-vehicle distance from the own vehicle to the preceding vehicle may be increased compared with the inter-vehicle distance set at a usual case where such a preceding vehicle is absent. This makes it possible to prevent the own vehicle to be excessively close to the preceding vehicle, for example, in a case where the non-skilled driver of the preceding vehicle performs sudden breaking or in a case where the behavior of the preceding vehicle becomes unstable.

Figure 6:
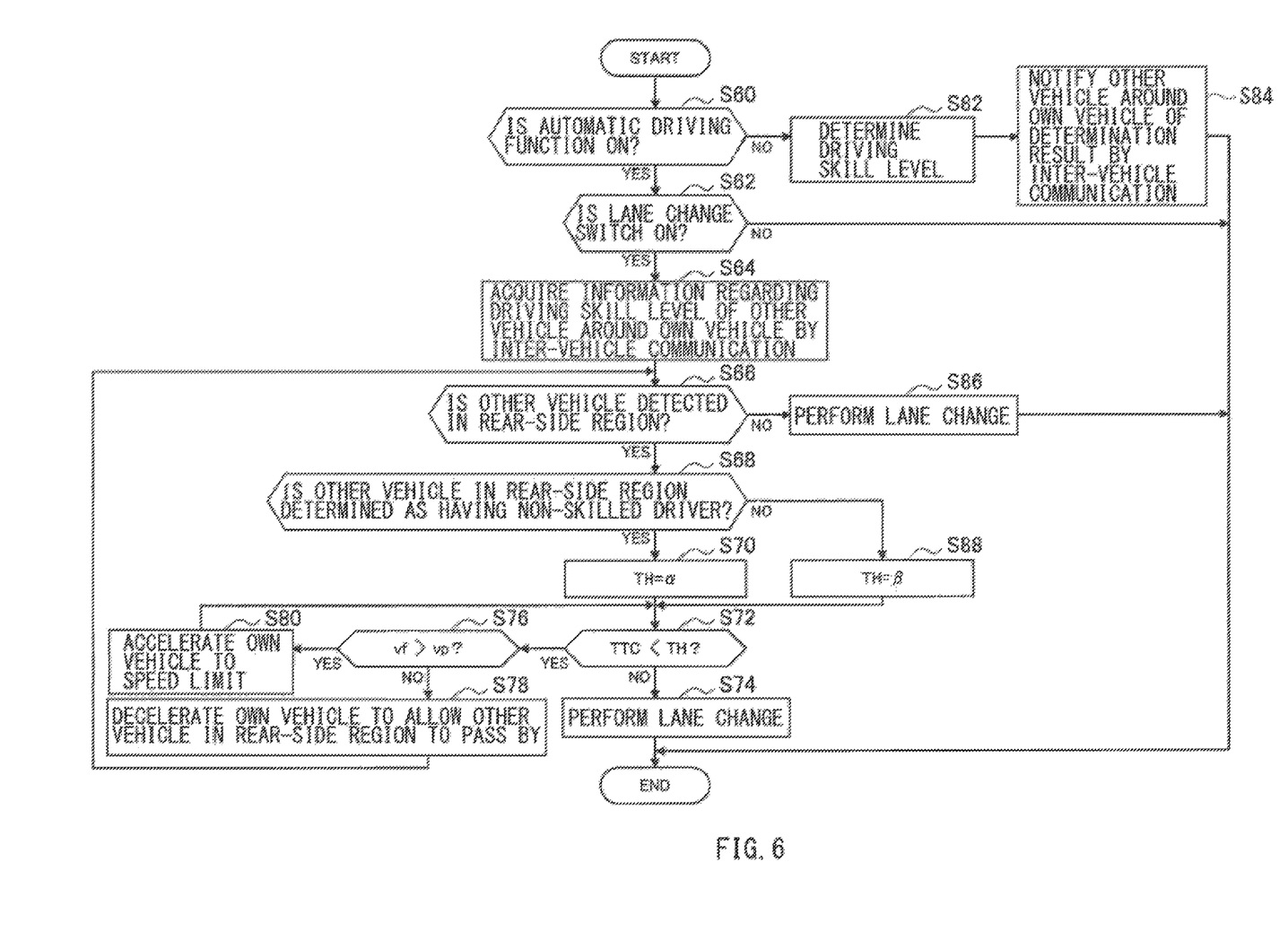
FIG. 6 is a flowchart illustrating an example of a process of notifying another vehicle around the own vehicle of the driving skill level under assumption of a situation where an automatic driving vehicle is mixed in a series of vehicles, and changing a setting of lane change timing.

Referring to the flowchart illustrated in FIG. 6, description is given next of a process, under assumption of a case where an automatic driving vehicle is mixed in a series of vehicles including the own vehicle, of notifying the other vehicle around the own vehicle of the driving skill level of the driver of the own vehicle and changing a setting of lane change timing. In a specific but non-limiting example of the example embodiment, execution of the lane change may be allowed when the contact time period TTC regarding contact between the own vehicle and the other vehicle traveling in a rear-side region of the own vehicle is greater than a predetermined time period TH, as the control of the lane change. The other vehicle traveling in the rear-side region of the own vehicle may be hereinafter referred to as a "side-by-side vehicle." In the example embodiment, the contact time period TTC may be given as a time period to a time at which the side-by-side vehicle comes into contact with the own vehicle upon completion of the lane change that causes the own vehicle to travel in front of the side-by-side vehicle. In order to avoid the contact, it may be necessary that time period necessary to complete the lane change that causes the own vehicle to travel in front of the side-by-side vehicle is sufficiently shorter than the contact time period TTC. In this point of view, the predetermined time period TH may be so set as to allow for safe lane change that causes the own vehicle to travel in front of the side-by-side vehicle.

First, in step S60, the controller 400 may determine whether the automatic driving function of the own vehicle is ON. When the automatic driving function of the own vehicle is ON (YES in step S60), the process may proceed to step S62. When the automatic driving function of the own vehicle is OFF (NO in step S60), the process may proceed to step S82.

When the process proceeds to step S62, the controller 400 may determine whether a lane change switch is ON. When the lane change switch is ON (YES in step S62), the process may proceed to step S64. The lane change switch may cause the lane on which the own vehicle travels to be changed, when being turned ON by operation of the driver or the determination by the controller 400 under the automatic driving. In step S64, the controller 400, in more detail, the skill level acquiring unit 406 may acquire information regarding the driving skill level of the driver of the other vehicle traveling around the own vehicle by performing the inter-vehicle communication between the own vehicle and the other vehicle around the own vehicle via the communication device 800. The controller 400 may also acquire the position information of the other vehicle together with the driving skill level in step S64.

In step S66 thereafter, the controller 400 may determine whether the other vehicle is detected in the rear-side region of the own vehicle. In other words, the controller 400 may determine whether the side-by-side vehicle is detected in step S66. When the side-by-side vehicle is detected (YES in step S66), the process may proceed to step S68 to execute a process related to determination as to whether execution of the lane change is permitted. In contrast, when the side-by-side vehicle is not detected (NO in step S66), the execution of the lane change is considered to be performed with no concern. Therefore, the process may proceed to step S86. In step S86, the lane change may be executed. Thereafter, the controller 400 may bring the process of the present routine to an end.

In step S68, the controller 400 may determine whether the driver of the side-by-side vehicle is the non-skilled driver. When the driver of the side-by-side vehicle is determined as being the non-skilled driver as a result of the inter-vehicle communication (YES in step S68), the process may proceed to step S70. In step S70, the controller 400 may set a threshold TH as the predetermined time period TH to a value α for the non-skilled driver (TH=α.)

When the driver of the side-by-side vehicle is determined as not being the non-skilled driver but being the skilled driver in step S68 (NO in step S68), the process may proceed to step S88. In step S88, the controller 400 may set the threshold TH to a value β for the skilled driver (TH=β.) The values α and β may each be set to any value under a condition of α<β.

In step S72 thereafter, the controller 400, in more detail, the contact time period calculating unit 414, may calculate the contact time period TTC regarding contact between the own vehicle and the side-by-side vehicle, and determine whether the calculated contact time period TTC is smaller than the threshold TH set in step S70 or S88. The contact time period TTC may be calculated by the following expression (1) as the above-described time period. In the expression (1), "xf" represents the position of the own vehicle, "xp" represents the position of the side-by-side vehicle, "vf" represents a speed of the own vehicle, and "vp" represents a speed of the side-by-side vehicle. That is, the contact time period TTC may be calculated by dividing a distance from the own vehicle to the side-by-side vehicle by a relative speed of the own vehicle to the side-by-side vehicle. The position of the side-by-side vehicle to be used for control may be a value acquired by the environment information acquiring unit 402, or a value acquired from the side-by-side vehicle or any other vehicle by means of the inter-vehicle communication.

$$TTC=(xf-xp)/(vf-vp) \tag{1}$$

When TTC<TH is satisfied in step S72 (YES in step S72), the process may proceed to step S76. In this case, the lane change may not be permitted as it is since the contact time period TTC is smaller than the threshold TH. In step S76, the controller 400 may determine whether the speed of the own vehicle is higher than the speed of the side-by-side vehicle. In other words, the controller 400 may determine whether vf>vp is satisfied in step S76. When vf>vp is satisfied in step S76 (YES in step S76), the process may proceed to step S80.

In step S80, the controller 400, or in more detail, the vehicle controlling unit 416, may accelerate the own vehicle up to a speed limit. The speed limit may be, for example but not limited to, a legal speed of a road on which the own vehicle travels. The process may return to step S72 after step S80.

When TTC≥TH holds in step S72 (NO in step S72), the process may proceed to step S74. In step S74, the controller 400, or in more detail, the vehicle controlling unit 416, may perform the lane change. At this time, the threshold TH for the non-skilled driver (=α) is greater than the threshold TH for the skilled driver (=β.) Therefore, in a case where the driver of the side-by-side vehicle is the non-skilled driver, a condition for permitting the lane change may be further limited compared with a case where the driver of the side-by-side vehicle is the skilled driver. In a specific but non-limiting example, a longer time period may be secured by the contact between the own vehicle and the side-by-side vehicle, which may securely suppress interference of the side-by-side vehicle in the lane change of the own vehicle. The controller 400 may bring the process of the present routine to an end after step S74.

In contrast, when vf≤vp holds in step S76 (NO in step S76), the process may proceed to step S78. In step S78, the controller 400, in more detail, the vehicle controlling unit 416, may decelerate the own vehicle and allow the side-by-side vehicle to pass by. The process may return to step S66 after step S78. Thereafter, for example, in a case where no vehicle is following the side-by-side vehicle, the process may proceed from step S66 to step S86 to execute the lane change.

When the process proceeds from step S60 to step S82, the controller 400 may determine the driving skill level of the driver of the own vehicle in step S82. The determination of the driving skill level may be performed by the method described with reference to FIG. 2 or 3.

In step S84 thereafter, the controller 400 may transmit a result of the determination in step S82 and the position of the own vehicle to the other vehicle traveling around the own vehicle, by performing the inter-vehicle communication between the own vehicle and the other vehicle around the own vehicle via the communication device 800. The other vehicle receiving the determination result may use the received determination result in step S68 when the other vehicle performs the process illustrated in FIG. 6. The controller 400 may bring the process of the present routine to an end after step S84.

A technique of causing an own vehicle to follow another preceding vehicle with a predetermined inter-vehicle distance has been existing and has been in practical use. An inter-vehicle distance that allows the own vehicle to respond to a possible behavior of the preceding vehicle should be kept in the following traveling described above. The inter-vehicle distance set under such assumption may be, however, insufficient depending on a driving skill level of a driver of the preceding vehicle in some cases. For example, the inter-vehicle distance set under such assumption may be insufficient in a case where the driving skill level of the driver of the preceding vehicle is low, since the driver with the low driving skill level sometimes performs, for example, sudden breaking at unnecessary timing. If the inter-vehicle distance is uniformly set under assumption of a usual case without taking into consideration the driving skill level of the driver of the preceding vehicle, the inter-vehicle distance from the own vehicle to the preceding vehicle can be excessively short in a case where the preceding vehicle performs sudden breaking. In order to avoid such a situation, the own vehicle needs to generate strong breaking force in accordance with the sudden breaking of the preceding vehicle, which leads to a concern of uncomfortable riding. Accordingly, it may be desired to take into consideration the driving skill level of the driver of the preceding vehicle in setting the inter-vehicle distance from the own vehicle to the preceding vehicle.

According to one embodiment of the technology, a driving skill level of a driver of another vehicle other than an own vehicle is acquired and an inter-vehicle distance from the own vehicle to the other vehicle is controlled on the basis of the acquired driving skill level. This makes it possible to optimally set the inter-vehicle distance from the own vehicle to the other vehicle.

Moreover, according to one embodiment of the technology, lane change of the own vehicle may be performed in a case where a predetermined condition based on the acquired driving skill level of the driver of the other vehicle is satisfied. This makes it possible to optimally set a distance from the own vehicle to the other vehicle to be secured at a time of the lane change.

Although some example embodiments of the technology have been described above in detail with reference to the accompanying drawings, the example embodiments described above do not limit the technology. It is clear that a person with a usual knowledge in a technical field of the technology is able to arrive at various alternations and modifications in the scope of the technical idea described in the appended claims. It should be clearly appreciated that such alternations and modifications are encompassed in the technical scope of the technology.

Each of the controller 400, the environment information acquiring unit 402, the environment state determining unit 404, the skill level acquiring unit 406, the inter-vehicle distance setting unit 408, the skill level determining unit 410, the transmission process unit 412, the contact time period calculating unit 414, the vehicle controlling unit 416, and the driver authentication unit 418 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of each of the controller 400, the environment information acquiring unit 402, the environment state determining unit 404, the skill level acquiring unit 406, the inter-vehicle distance setting unit 408, the skill level determining unit 410, the transmission process unit 412, the contact time period calculating unit 414, the vehicle controlling unit 416, and the driver authentication unit 418 illustrated in FIG. 1. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of each of the controller 400, the environment information acquiring unit 402, the environment state determining unit 404, the skill level acquiring unit 406, the inter-vehicle distance setting unit 408, the skill level determining unit 410, the transmission process unit 412, the contact time period calculating unit 414, the vehicle controlling unit 416, and the driver authentication unit 418 illustrated in FIG. 1.

The invention claimed is:

1. A vehicle comprising:
a vehicle sensor configured to detect yaw rate of the vehicle by using sensors installed in the vehicle;
a steering angle sensor configured to detect a rotation angle of a steering wheel of the vehicle;
an output unit configured to output information to outside of the vehicle; and
a controller configured to be coupled with the vehicle sensor, the steering angle sensor, and the output unit, wherein
the controller is configured to:
    determine that the vehicle is traveling on a curved road when the controller detects that the yaw rate detected by the vehicle sensor is greater than a first threshold and smaller than a second threshold,
    when the controller detects that traveling time period during which the vehicle is traveling on the curved road reaches a first time period, calculate a standard deviation of one of steering angular velocity and steering angular acceleration in a second time period that includes time periods before and after timing at which the yaw rate of the vehicle is a maximum value in the first time period,
    determine that a driver operating of the vehicle is a non-skilled driver when the standard deviation is greater than a predetermined threshold, and
    output information including that the driver is the non-skilled driver toward outside of the vehicle by using the output unit when the controller determines that the driver is the non-skilled driver.

2. A control apparatus for a vehicle, the control apparatus comprising:
a communication unit configured to communicate information between a first vehicle according to claim 1 and a second vehicle being an own vehicle; and
a controller configured to:
    couple with the communication unit, and
    control the second vehicle to perform lane change from a second lane where the second vehicle is traveling to a first lane where the first vehicle is traveling, when a contact time period being a period of time to a time at which the second vehicle comes into contact with the first vehicle is equal to or greater than a predetermined time period,
wherein the controller is configured to:
    receive information, by using the communication unit, from the first vehicle, the information including that a driver operating the first vehicle is a non-skilled driver, and
    increase the predetermined time period when the controller detects the information received from the first vehicle is information that the driver operating the first vehicle is a non-skilled driver.

3. The vehicle according to claim 1, wherein
an output device is a display arranged at a position visible from outside of the vehicle, and
the controller is configured to enable an output device to display information including that the driver is the non-skilled driver toward outside of the vehicle.

4. The vehicle according to claim 1, wherein
an output device is a transmission process device configured to transmit around the vehicle via a communication device, information including that the driver is the non-skilled driver.

5. The vehicle according to claim 4, wherein the transmission process device is configured to transmit a result of a determination that vehicles are around the vehicle and prompt the vehicles around the vehicle to change a setting of an inter-vehicle distance from the vehicle to a preceding vehicle traveling in front of the vehicle.

6. The vehicle according to claim 4, wherein the transmission process device is configured to transmit a result of a determination that vehicles are around the vehicle when the vehicle stops performing automatic driving.

7. A vehicle comprising:
a communication unit configured to communicate with a second vehicle traveling in front of the vehicle, the second vehicle according to the claim 4;
a controller configured to be coupled with the communication unit, and control the vehicle so that a predetermined distance is kept between the second vehicle and the vehicle, wherein the controller is configured to:
    receive information, by using the communication unit, from the second vehicle, the information including that a driver operating the second vehicle is a non-skilled driver; and
    control to the vehicle to increase an inter-vehicle distance from the vehicle to the second vehicle when the controller detects the information received from the second vehicle is information that the driver operating the second vehicle is a non-skilled driver.

8. The vehicle according to claim 7, wherein the controller is configured to cause the inter-vehicle distance to be greater as an acquired driving skill level is lower.

9. The control apparatus according to claim 2, wherein the first vehicle is traveling side by side with the second vehicle.

10. The control apparatus according to claim 9, wherein a lane change device is configured to perform the lane change of the second vehicle to cause the second vehicle to travel in front of the first vehicle.

11. The control apparatus according to claim 2, wherein a lane change device is configured to
accelerate the second vehicle on a condition that the contact time period is shorter than the predetermined time period and a vehicle speed of the first vehicle is lower than a vehicle speed of the second vehicle, and
perform the lane change when the contact time period becomes equal to or longer than the predetermined time period after the second vehicle is accelerated.

12. The control apparatus according to claim 2, wherein a lane change device is configured to perform the lane change when the second vehicle is performing automatic driving.

* * * * *